T. Uren,
Artificial Arm and Hand.
N° 46,158. Patented Jan. 31, 1865.
Fig. 1. Fig. 4. Fig. 9.
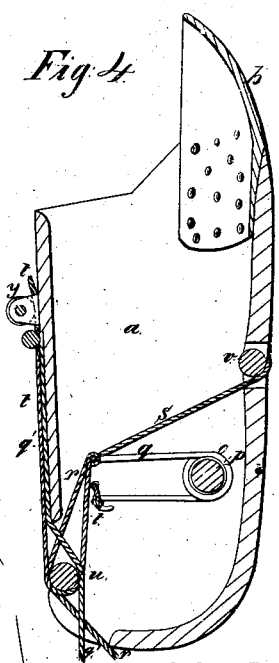
Fig. 3.
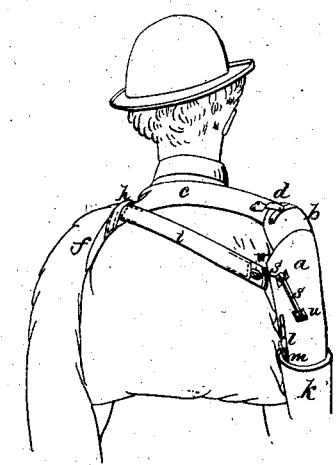
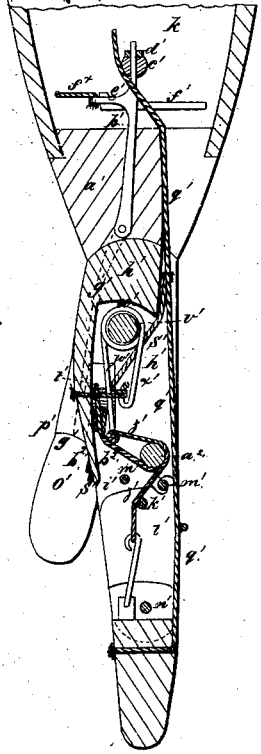
Fig. 10.
Witnesses:
Wm H Bishop
A. DeLacy
Inventor
Thomas Uren 3 Sheets—Sheet 2.
T. Uren,
Artificial Arm and Hand.
No. 46,158. Patented Jan. 31, 1865.

Fig. 7ª. 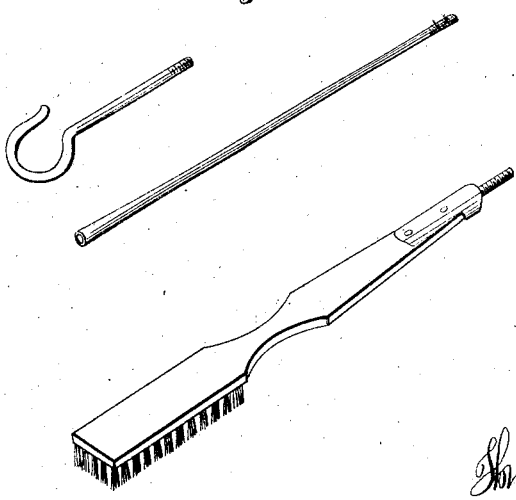
Witnesses:
Wm H Bishop
A. DeLacy.
Inventor:
Thomas Uren

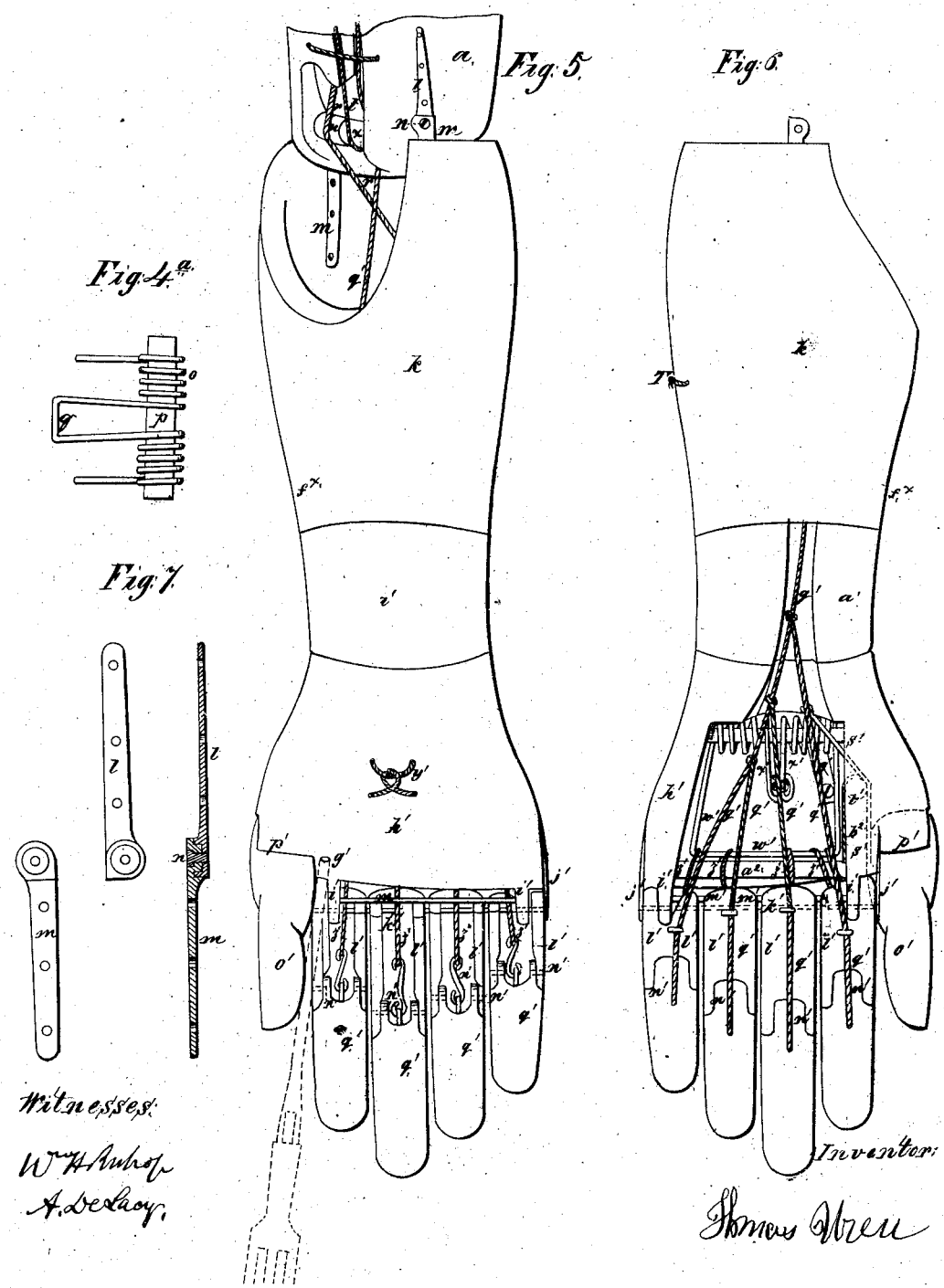

UNITED STATES PATENT OFFICE.

THOMAS UREN, OF NEW YORK, N. Y.

IMPROVEMENT IN ARTIFICIAL ARMS AND HANDS.

Specification forming part of Letters Patent No. 46,158, dated January 31, 1865.

*To all whom it may concern:*

Be it known that I, THOMAS UREN, of the city, county, and State of New York, have invented certain new and useful Improvements in Artificial Arms and Hands; and I do hereby declare that the following is a full, clear, and exact description thereof, reference being had to the accompanying drawings, making part of this specification, in which—

Figure 2:
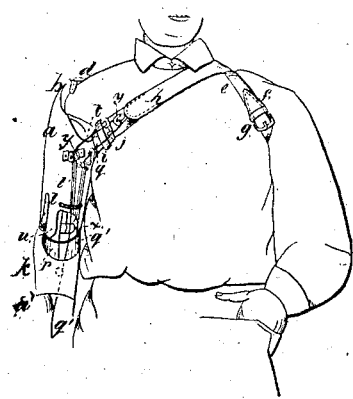

Figure 1 is an elevation of an artificial arm and hand applied to an upper amputation; Fig. 2, a front, and Fig. 3 a back, view of the upper part of a person to represent the mode of attaching the artificial arm. Fig. 4 is a longitudinal section of the arm and hand, the lower arm and hand taken in a plane at right angles to the plane of the palm of the hand and with the fingers distended, and the upper arm detached and partly turned that the plane of the section may represent the mechanism; Fig. 5, a face view of the palm of the hand with the lower and a portion of the upper arm; Fig. 6, a like view of the back of the hand, wrist, and forearm. Fig. 7 represents separate views on an enlarged scale of the pieces which form the elbow-joint; and Fig. 7ª represents various instruments to be attached to the hand.

The figures representing modifications will be described hereinafter.

The same letters indicate like parts in all the figures in which they appear.

The object of my said invention is to produce an artificial arm and hand suitable for any amputation below the shoulder, and which, whether applied to amputations above or below the elbow, will enable the person wearing it to produce with facility the most essential motions of the arm and fingers, or either, by the simple movement of the stump of the amputated arm.

I will first describe my said invention as applied to an upper amputation.

In the accompanying drawings, $a$ represents the upper arm, or that portion of it which extends from the elbow to the shoulder. It is made hollow, of wood, papier-maché, leather, or other suitable material. The upper end is suitably formed to receive the stump of the amputated arm, and to extend partly over the shoulder, as at $b$, to which part a broad strap, $c$, made of leather or other suitable material, is connected by a metallic joint, which I prefer to make as represented at $d$. This strap passes around the upper part of the back to the other shoulder, where it branches into two parts, $e f$, the branch $e$ passing over the shoulder to the front, where it is provided with a buckle, $g$, the other part, $f$, passing under the arm-pit and secured in front to the branch $e$ by the buckle $g$. Two other straps, $h$ and $i$, are secured diagonally to the branch $f$ just over the shoulder-blade, the one, $h$, passing over the shoulder to the front, and the other, $i$, around the back and under the stump of the amputated arm to the front, where it is connected to the strap $h$ by a buckle, $j$.

By the means above described the upper artificial arm, $a$, is so secured to the stump of the amputated arm as to be moved by it at will.

The fore or lower arm $k$ is also made hollow, of wood or other suitable material, and it is hinged to the part $a$ to form the elbow-joint by metallic joint-pieces $l\ l$ and $m\ m$. These joint-pieces are represented separately at Fig. 7. The pieces $l\ l$ are let into the two opposite sides of the upper arm, $a$, so as to be flush with the outer surface thereof, and are formed with circular sockets to receive circular projections on the joint-pieces $m\ m$, the stems of which latter are in like manner secured to the forearm, but on the inside thereof. These joint-pieces are then connected by screws $n\ n$, which act as fulcrum-pins to form the elbow-joint.

A coiled or other equivalent spring, $o$, (see Figs. 4 and 4ª,) is inserted in the upper arm. I prefer to make it as represented, coiled from each end around a pin, $p$, extending across the hollow of the arm and forming a loop, $q$, between the two coils. The extreme ends of the spring rest against and are properly secured to the inside of the arm as represented.

To the extremity of the loop $q$ are secured three cords, $r$, $s$, and $t$, by preference made of catgut. The cord $r$ extends from the loop $q$, which acts as a spring lever, over a roller, $u$, near the lower end of the upper arm, $a$, and thence into the forearm $k$, where it is secured by suitable means. For simplicity and cheapness this cord is divided and passed through two holes and tied together on the outside of the forearm, (see Fig. 6,) so that it can be readily lengthened and shortened as it is best to have it, so that its length can be readily adjusted. Any other suitable mode of attachment may be substituted. By this mode of connection the tension of the spring $o$ sustains the weight of the forearm $k$ and its appendages. The second cord $s$, is attached to the loop $q$ of the said spring, and extends up and around a roller, $v$, mounted in a hole made through what may be termed the "outside" of the upper arm, and from this roller the said cord extends upward in a groove in the outer surface of the arm, and its upper end is tied to a loop, $w$, on that part of the strap $i$ which is near the armpit, so that by moving the stump of the amputated arm forward, as with a natural arm, to lift the hand toward the face, a pull is made on the said cord $s$, which pulls the loop $q$ of the spring $o$ upward, and this, by reason of its connection with the cord $r$, draws the forearm upward by a movement apparently natural. The third cord, $t$, is also attached to the loop $q$ of the spring $o$, and thence it passes under and around a roller, $x$, to and along a groove on the outer surface of what may be termed the "front" part of the arm, under a guide-roller, $y$, and is attached to a loop, $z$, on the strap $h$, which passes over the breast, so that, by reason of this connection, when the stump of the amputated arm is moved back the spring $o$ is pulled downward, the cords $r$ and $s$ at the same time are loosened, and the forearm $k$ is permitted to fall until stopped by the shoulders on the elbow-joint. In view of the functions performed by these three cords, I term the cord $r$ the "balance-cord," because, by reason of its connections it enables the spring $o$ to balance the weight of the forearm and its appendages, so that when extended it will hang and swing naturally, and facilitates the operations to be performed by the other cords. I term the cord $s$ the "contracting-cord," because, by its connections, the forearm is elevated as by the contracting muscles of a natural arm, and the cord $t$, I term the "expanding-cord," because, by its connections, it throws out the forearm as by the expanding muscles of a natural arm. These several cords are best made adjustable, which is done by simply tying, although other known and suitable means of attachment and adjustment may be substituted.

The wrist part $a'$ is made separate from the forearm $k$ and connected therewith by a flute-joint, so that the hand connected therewith may be turned. A metallic rod, $b'$, is fitted to the inside of the wrist-piece and extends through it longitudinally, and one end of it extends into the forearm $k$ and through a hole in a cross-piece, $c'$, and there held by a screw-nut, $d'$, tapped on the end of the said rod. The rod is free to turn in the said cross-piece. An arm, $e'$, projects from one side of the said rod within the forearm $k$, and the outer end of the said arm $e'$ of the rod $b'$ is connected with one side of the forearm by an india-rubber or other elastic cord, $f'$, and with the opposite side of the forearm by a cord, $f^x$, which passes through to the outside, where it is tied, so that by adjusting the said tie the tension of the india-rubber or other elastic cord can be regulated at pleasure. By this means the hand, which is connected with the wrist-piece in manner to be hereinafter described can be turned in or out and set as may be desired, not automatically, however.

The outer end of the rod $b'$, is connected by a hinge-joint with another rod, $g'$, which extends through and is secured by screws or equivalent means to the hand $h'$. The outer end of the said rod $g'$ is formed with a socket, which is tapped, and the opening of this socket is in the palm of the hand near the inner part of the thumb and forefinger, so that a hook, fork, or other instrument can be readily inserted. Some of these instruments are represented separately at $7^a$, and a fork is represented in place by dotted lines in Fig. 5.

The inner end of the hand-piece $h'$ is made semi-cylindrical and fitted to the outer end of the wrist-piece $a'$, of a corresponding form to receive it, and the joint of the two rods $b'$ and $g'$ is in line, so that a slight play is given to the junction of the hand with the wrist.

The hand is preferably made in one piece as far as the main knuckle-joints $i'$, and on each side there is a plate, $j'$, which projects forward, and to these plates is secured a fulcrum-pin, $k'$, on which the rear ends of all the fingers $l'$ $l'$ $l'$ $l'$ are mounted, so as to turn to a limited extent, the rear ends of the fingers being so formed as to strike against two rods, $m'$, parallel with the fulcrum-pin $k'$ and back of it, which serve as stops to limit the range of motion of the fingers either when opened or closed. The fingers are each formed with a second knuckle-joint, $n'$, which is preferably made in the form of a rule-joint. The thumb $o'$ is connected with the hand by a rule or other equivalent joint, $p'$. If desired, it may be made with a second joint like the fingers, but this is not deemed to be essential. Four cords, $q'$ $q'$ $q'$ $q'$, preferably made of catgut, and which I term the "finger-expansion cords," are attached one to each finger between the second knuckle joints and the tips, pass over the outer surfaces, which are best made with guide-grooves for the purpose, and under guide-staples near the main knuckles. The four cords are connected together at or near the wrist, and thence continue as a single cord through the inside of the forearm to and along a groove, and under the roller $x$, if preferred; thence along the upper arm, $a$, by the side of the cord $t$, before described, and attached to the loop $z$ of the body-strap $h$, which is in front of the breast, so that the same back movement of the stump of the amputated arm which is required for throwing out or straightening the forearm $k$ will open the fingers of the hand. A fifth cord, $s'$, which is attached to the thumb back of its fulcrum-pin, and which I term the "thumb-expansion cord," passes inside of the hand under a roller, $t'$, and is then attached to the finger-cords where they are united as one cord and to be operated in like manner. The four fingers and the thumb are closed by the tension of a spring, $u'$, within the hand.

This spring is preferably made of coiled wire and held in place by a pin, $v'$, which extends through it and across the inside of the hand, and this spring is so coiled as to have two arms, $w'$ and $x'$, the arm $w'$, by bending the wire about the middle, of its length in the form of three sides of a parallelogram, and then coiling up each end in the form of a helix, and then uniting the two ends and leaving them to project sufficiently to form the other arm, $x'$, to the extremity of which latter a cord, $y$, is attached, the two ends of which pass through holes in the palm of the hand to the outside, where they are attached, so that they can be readily tightened or loosened to increase or decrease the tension of the spring to regulate the grasp of the fingers and thumb.

Four cords, $z'$, termed the "finger-contracting cords," (one for each finger,) are attached to the under side of the fingers, between the second knuckle-joints and the tips, pass to the inside of the hand over a roller or guide-pin, $a^2$, to the arm $w'$ of the spring $u'$, to which they are all attached, and a fifth cord, $b^2$, termed the "thumb-contracting cord," is attached to the inner part of the thumb and passes around the roller $t'$, and thence around the same roller or guide-pin $a^2$ as the finger-contracting cords, and like them attached to the arm $w'$ of the spring $u'$.

By the means above described the fingers and thumb are closed or contracted by a spring, the tension of which always tends to close them, and by a force which can be readily regulated, and they are opened or expanded by pulling on the finger and thumb expanding cords, which is effected by the same outward movement of the stump of the amputated arm which is used for throwing out the forearm.

Figure 8:
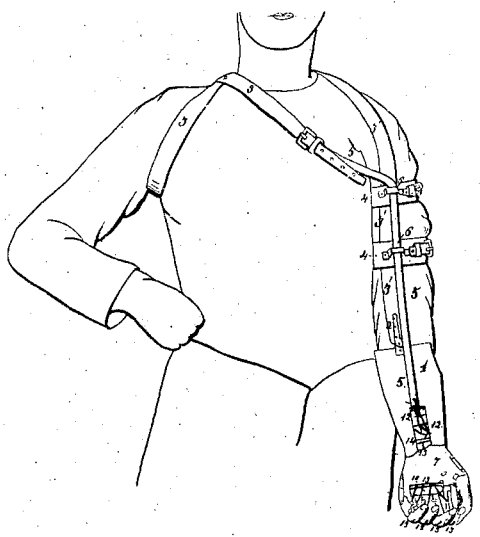

The modification of my said invention, which I prefer for amputations at or near the wrist, are represented in Fig. 8, which shows the artificial hand and wrist applied to a person in Fig. 9, which is a longitudinal section in a plane at right angles to the palm of the hand, and Fig. 10, which represents the mode of strapping. In the said Figs. 8, 9, and 10 the artificial forearm 1 is suitably formed to receive the natural forearm, or so much of it as remains, and the upper end thereof is connected by elbow-joint pieces, 2, (constructed as before described, and represented in reference to an upper amputation,) with two straps, 3 3', made of leather or other suitable material, one on each side of the upper natural arm, and which are secured thereto by cross-straps, 4 4, provided with suitable buckles. The strap 3, which is on the outside of the upper arm on the crippled side, extends around and back of the shoulder-joint on that side of the body, around the back, and over the other shoulder, down the front thereof, under the arm-pit to the back, and over the same shoulder to the front, and being secured where it passes over itself. The other strap, 3', which is under the forearm, extends up in front and over the shoulder to the strap 3, to which it is secured on the shoulder; and the extremity of the strap 3 in front is secured by a buckle or other equivalent means to a narrow strap or cord, 5, which passes down under guide-rollers 6 6, secured to the surface of the cross-straps 4 4, and down to the wrist, where it is secured to the expansion finger-cords, as will be presently described.

The hand 7 and the fingers are constructed and connected as already described, and the inner end of the hand is fitted to the outer end of the forearm 1 by a semi-cylindrical socket, as in the previous example, but without the interposition of a wrist-piece, although a wrist-piece can be used if the amputation be not too near to the wrist. Inside of the hand there is a hinge-rod, 8, as in the previous examples, except that it does not extend so far into the forearm.

The contraction finger-cords 9 pass over a roller, 10, and around a roller, 11, in the forearm, and are then attached to a spring-lever, 12, formed as described in the first example, the tension of which tends to close the fingers. The expansion-cords 13 pass around roller 10, thence around a roller, 14, and then are connected to the opposite side of the spring-lever 12. The only difference in these respects is that in the present modification the spring-lever has its tension reversed. The extremity of the strap 5, before described, is attached to the outer end of the spring-arm 12.

From the foregoing it will be seen that when applied as described the wearer, by simply drawing up the forearm, or moving the upper arm forward, will loosen the strap 5 and the expansion-cords of the fingers and thumb so that the fingers and thumb will be drawn in or closed by the tension of the spring and by throwing out or straightening the forearm or moving the upper arm backward will draw on the strap or cord 5, which will pull on the expansion-cords of the fingers and thumb, and thereby overcome the tension of the spring and open the hand; and as the spring-arm 12 projects beyond the outer surface of the forearm, the wearer, by bearing it on a table or any other surface and pushing the arm forward, will press the spring-arm back, and, by reason of the connecticus, open the fingers and thumb; and, although I have herein described the adjustability of the several cords as being effected by simply tying, I wish it to be distinctly understood that I do not limit myself to the use of such means of adjustment and attachment, having simply adopted such mode as being cheap, simple, and convenient; but it will be obvious that other and equivalent modes of attachment and adjustment may be substituted without changing the principle or mode of operation which constitutes my invention.

What I claim as my invention, and desire to secure by Letters Patent, is—

1. The combination of the expansion and contraction cords with each other and with the artificial upper and forearm hinged at the elbow-joint, and with the straps, or the equivalents thereof, for securing the artificial arm to the body, and with which the said expansion and contraction cords are connected, substantially as described, whereby the forearm can be lifted and bent or thrown out and straightened at the will of the person wearing it by a simple motion forward or backward of the stump of the amputated arm.

2. The combination of the hinged forearm with the balance-cord and spring, substantially as described, whereby the weight of the hinged forearm is balanced by the said spring, and when desired can be made to hang naturally, as described, while at the same time the forearm being so balanced will greatly facilitate the motions to be imparted to the artificial arm.

3. The combination of the expansion and contraction cords with the balance-cord and spring and with the hinged forearm, substantially as and for the purpose specified.

4. The combination of the hinged hand, the turning wrist-piece, the forearm, and the hinged connecting-rod, substantially as and for the purpose specified.

5. The hinged hand, the turning wrist-piece, the forearm, and the hinged rod by which they are connected, substantially as specified, in combination with the means of connecting the said hinged rod with the forearm by a turning-joint and spring, or equivalent adjustable connection, substantially as specified, so as to admit of turning the wrist, as set forth.

6. The hinged fingers, with the contraction-cords, and the spring with which the said cords are connected, substantially as described, whereby the fingers, and, as an equivalent, the thumb, can be contracted, as set forth, and this whether the said spring be located within the hand or in the arm, as set forth.

7. The hinged fingers, the contracting-cords, and the spring connected therewith, in combination with the expansion finger cords, substantially as described, whereby the fingers can be opened or closed at the will of the person wearing the artificial hand, as set forth.

THOMAS UREN.

Witnesses.
A. DE LACY.
WM. H. BISHOP.